United States Patent [19]
Jonsson et al.

[11] 3,878,960

[45] Apr. 22, 1975

[54] GLASS CONTAINER WITH A SHRUNK-ON PLASTIC PROTECTIVE COVER

[75] Inventors: Bo Ragnar Jonsson, Hammar; Gunnar George Toll; Bo Torsten Krister Bodelind, both of Bohus, all of Sweden

[73] Assignee: Aktiebolaget Platmanufaktur, Malmo, Sweden

[22] Filed: Oct. 5, 1973

[21] Appl. No.: 403,981

Related U.S. Application Data

[63] Continuation-in-part of Ser. No. 261,970, June 12, 1972, abandoned, which is a continuation of Ser. No. 41,623, May 28, 1970, abandoned.

[52] U.S. Cl. ............................................... 215/12 R
[51] Int. Cl. ............................................ B65d 23/08
[58] Field of Search ......... 215/12 R, DIG. 6; 117/72

[56] References Cited
UNITED STATES PATENTS

| | | | |
|---|---|---|---|
| 3,379,559 | 4/1968 | Gerhardt | 117/72 |
| 3,420,693 | 1/1969 | Scholes | 117/72 |
| 3,507,680 | 4/1970 | Kiel | 117/72 X |
| 3,554,787 | 1/1971 | Plymale | 117/72 |
| 3,635,367 | 1/1972 | Morita | 215/12 R X |
| 3,698,586 | 10/1972 | Terner | 215/12 R |

*Primary Examiner*—Donald F. Norton
*Attorney, Agent, or Firm*—Hane, Baxley & Spiecens

[57] ABSTRACT

A plastic covered glass container comprises a hollow glass member whose outer surface is hardened. About at least the sidewall of the container is fitted a plastic sleeve which shrinks when exposed to heat to tightly encompass the container. Between the cover and the sidewall is a layer of friction-reducing material.

10 Claims, No Drawings

GLASS CONTAINER WITH A SHRUNK-ON PLASTIC PROTECTIVE COVER

This invention relates to glass containers with at least one cover on the outer surface of the glass for reinforcement and for protection of the glass and is a continuation-in-part of application Ser. No. 261,970, filed June 12, 1972 now abandoned, which is a continuation of application Ser. No. 41,623, filed may 28, 1970 now abandoned.

The rising standard of living during recent years has created a considerable increase in the use of containers of various kinds. Glass containers, particularly for beer and soft drinks, because of their low price and general technical appropriateness, have had a corresponding considerable increase in use, both in the form of deposit bottles as well as non-return bottles. Regrettably, it has proved that the economy and technical appropriateness of glass containers can be a disadvantage since people throw away such containers in places other than rubbish cans or corresponding arrangements for the disposal of refuse, and such glass is, accordingly, not subjected to the normal destruction process at refuse destruction plants. Since glass has such good technical properties, which is an advantage from the point of view of use, it is not destroyed by the forces of nature in what can be considered a reasonable period of time. Moreover, if the glass container is shattered, sharp splinters result, which will retain their sharpness for a considerable time. Even if the number of glass containers which, through carelessness, are disposed of outdoors is extremely small compared with total turnover, it is, of course, of great interest to be able to produce glass containers that eliminate the disadvantages herein mentioned, since there will in all probability, regrettably, always be some careless people who throw away containers particularly when they are expendable.

BACKGROUND

The reason why glass containers with properties other than those hitherto used have not previously been available in that research on containers has always been directed towards achieving technically improved glass, which thus is a disadvantage from the point of view of ecology when glass containers are discarded in places where such disposal should not take place.

Although the primary objective is, of course, to prevent glass containers from being disposed in places other than those intended for refuse, one must accept people for what they are and therefore try to minimize the problems arising from the careless disposal of glass containers.

One of the worst problems is the shattering of the container into a scattered mass of sharp splinters which can cut unsuspecting people.

Another problem with hitherto used containers is the high noise levels generated at the filling lines of the breweries.

It is accordingly a general object of the invention to provide a glass container that is at least partially covered with a plastic sleeve which while being thick enough to retain the pieces of broken glass from a safety point of view and to reduce noise levels when handled, is cheap enough for the mass-production bottles required by the beer and soft drink industries.

SUMMARY OF THE INVENTION

It is, of course, previously known to apply a plastic coating on a glass container, e.g., a thick plastic layer, with thicknesses of up to several millimeters, on bottles of the aerosol type. However, this thick, rigid layer forms a second, outer container to protect the inner glass bottle from being broken. But a sheathing of this kind is not economically practicable to use in the production of cheap bottles.

In general, the invention contemplates providing a cheap, lightweight container which provides good safety against explosion and which also reduces noise levels when handled. Thus in order to minimize the weight while retaining the strength, the glass surfaces of the container are always hardened. Such surfaces, however, are very sensitive to scratching and are protected by a very thin, nearly molecular layer of polyethylene or polyoxyethylene stearate, which serves as a friction reducing layer protecting the glass surfaces from wear.

The invention thus relates to a glass container with at least its sidewall surface hardened. Shrunk onto the container in the region of the sidewall is a cover of plastic material. Between the cover and the sidewall is a layer of friction-reducing material.

More particularly, there is provided a glass container whose sidewall surfaces, at least, have been surface hardened. The surface hardening can be accomplished in several ways. For example, the container can be dipped in molten potassium nitrate. In such case, potassium ions replace sodium ions at and near the sidewall surface of the container. Upon cooling, the container surface undergoes a compression which yields a substantial increase in the strength of the container. Alternatively, the ion exchange can be accomplished by introducing lithium ions from a suitable lithium compound at a temperature close to the softening point of the glass. The addition of lithium oxide to the glass results in a glass material with low thermal expansion at the surface which can be crystallized by heat treatment. This layer has a low expansion, and when cooled gives the desired compression, at the same time as good chemical resistance is obtained.

Over the surface hardened region of the container is another strengthening layer of tin oxide of titanium dioxide applied. These layers can be put on by passing the surface-hardened containers through a gas tunnel which has an atmosphere of stannic chloride or isopropylorthotitanate, respectively.

On the top of this strengthening layer a thin, near molecular layer of organic material is sprayed on, which has friction-reducing properties. For example, a polyoxyethylene stearate or polyethylene in water suspension can be sprayed on the container. When the water evaporates a thin layer of stearate or polyethylene remains on the surface.

On top of this friction-reducing layer is the final plastic cover which acts to absorb or reduce impact and to contain glass fragments upon breakage, as well as reducing noise when handled.

According to the invention, the plastic cover is a sleeve of plastic which encompasses the sidewall and then through the application of heat is shrunk tightly against the sidewall. The cover can be in the form of a preformed sleeve which is slipped over the container to encompass the sidewall. Alternatively, the cover can be in sheet form and is wrapped around the sidewall with the abutting or overlapping ends being joined together by welding or the like. Suitable materials for the plastic cover can be polystyrene, polyethylene, polyvinyl chloride as well as foamed types of these materials.

It has been found that the plastic cover should be between 0.04 and 0.6mm and optimally between 0.1 and 0.2mm thick to insure that the plastic cover will contain shattered glass pieces if the container is broken.

Practical tests have shown that when bottles made according to the invention are broken, the very thin coherent outer plastic cover will, to a large extent, prevent the pieces from scattering. The outer plastic surface cover should extend at least around the side walls of the container.

It should be obvious that the glass container provided with a plastic cover according to the invention will also be stronger, in that it will at least have greater shock resistance even if the tin or titanate layers are absent.

Thus, if desired, the thickness of the glass can be reduced, to provide a lighter-weight container. This is of considerable importance from the point of view of transportation economy. A further advantage is that there will be less broken glass when the container is handled, particularly on the filling lines in the breweries, which consequently can be operated with a greater capacity and at a considerably lower noise level.

More particularly, the process of making plastic-coated glass containers according to the invention will now be described in detail. The raw glass containers are made in conventional glass container making machines. The containers are then hardened. The hardening may be accomplished by dipping the containers into molten potassium nitrate as they emerge from the glass container making machines. The exchange of sodium ions then takes place with the potassium ions producing strong tensions in the glass surface after cooling to room temperature.

The hardening is then complete by passing the glass containers at a temperature in the range of 450° to 600°C through a gas tunnel which has an atmosphere of either stannic chloride to coat the container with a layer of tin oxide or an atmosphere of isopropylorthotitanate to coat the container with a layer of titanium dioxide. The hardening with stannic oxide or titanium dioxide can be done without previous ion-exchange.

After the above-described hardening, the outer glass surface is covered with a thin layer of metal oxide which is extremely sensitive to scratching and, therefore, should be immediately protected. Accordingly, the so-coated glass containers are cooled to approximately 100°C and sprayed with a polyethylene water suspension at a temperature of approximately 100°C. This smooth layer then serves as a friction reducing layer.

Alternatively a polyoxyethylene stearate solution may be sprayed on to form the friction-reducing layer.

On top of the friction reducing layer the outer plastic cover is now applied. This can be done by slipping a preformed plastic sleeve over the container to encompass the sidewall. The container with sleeve is then heated to a suitable temperature in relation to the used plastic sleeve material, which thus shrinks to form the outer shrunk-on cover.

Alternatively, a foil is wrapped around the sidewall whereby the abutting or overlapping ends are welded together. The container with foil is then heated to a suitable temperature with regard to the used plastic foil material, which thus shrinks to form the outer shrunk-on cover.

It is obvious that a plurality of variations and modifications are possible within the scope of the invention, and it should then be noted that although the specification and claims essentially refer only to the coating of the external sides of a container, the corresponding steps, to the extent applicable, can also be applied internally in the container.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A plastic-covered glass container comprising a hollow member of glass material with at least its outer surface hardened, a cover of plastic shrunk onto at least the sidewall of said hollow member, and a layer of friction-reducing material between the shrunk-on cover of plastic and the sidewall of said hollow member.

2. The plastic-covered glass container of claim 1 wherein said cover of plastic is between 0.04 and 0.6mm thick.

3. The plastic-covered glass container of claim 2 wherein said cover of plastic is between 0.1 and 0.2mm thick.

4. The plastic-covered glass container of claim 1 wherein there is first reinforcing layer of a tin compound on the outer surface of said hollow glass member.

5. The plastic-covered glass container of claim 1 wherein there is first reinforcing layer of a titanium compound on the outer surface of said hollow glass member.

6. The plastic-covered glass container of claim 1 wherein the outer surface of said hollow glass member contains potassium ions.

7. The plastic-covered glass container of claim 6 wherein the outer surface of said hollow glass member is crystalline.

8. The plastic-covered glass container of claim 1 wherein said cover of plastic comprises a preformed sleeve of plastic.

9. The plastic-covered glass container of claim 1 wherein said cover of plastic comprises a foil wrapped around said sidewall and joined together at its ends.

10. The plastic-covered glass container of claim 1 wherein the material for the cover is of thermoplastic material, e.g., from the group consisting of polystyrene, polyethylene, and polyvinyl chloride or foamed forms of these materials.

* * * * *